(12) United States Patent
Austin

(10) Patent No.: US 10,771,859 B2
(45) Date of Patent: *Sep. 8, 2020

(54) PROVISIONING COMMERCIAL-FREE MEDIA CONTENT

(71) Applicant: DISH Technologies L.L.C., Englewood, CO (US)

(72) Inventor: Jarrod Austin, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,920

(22) Filed: Nov. 8, 2018

(65) Prior Publication Data

US 2019/0075369 A1 Mar. 7, 2019

Related U.S. Application Data

(63) Continuation of application No. 15/972,689, filed on May 7, 2018, now Pat. No. 10,165,338, which is a
(Continued)

(51) Int. Cl.
*H04N 5/445* (2011.01)
*H04N 21/234* (2011.01)
*H04N 21/235* (2011.01)
*H04N 21/81* (2011.01)
*H04N 21/231* (2011.01)
(Continued)

(52) U.S. Cl.
CPC ....... *H04N 21/812* (2013.01); *H04N 5/44543* (2013.01); *H04N 21/23109* (2013.01); *H04N 21/2665* (2013.01); *H04N 21/2668* (2013.01); *H04N 21/431* (2013.01); *H04N 21/4334* (2013.01); *H04N 21/4622* (2013.01); *H04N 21/4722* (2013.01); *H04N 21/4828* (2013.01); *H04N 5/445* (2013.01); *H04N 21/4325* (2013.01); *H04N 21/4532* (2013.01); *H04N 21/4782* (2013.01); *H04N 21/4788* (2013.01); *H04N 21/47217* (2013.01); *H04N 2005/44556* (2013.01)

(58) Field of Classification Search
CPC .................................................. H04N 21/234
USPC ..................................................... 725/37–61
See application file for complete search history.

(56) References Cited

U.S. PATENT DOCUMENTS 6,477,705 B1   11/2002   Yuen et al.
6,760,916 B2   7/2004    Holtz et al.
(Continued)

FOREIGN PATENT DOCUMENTS

WO   2008080814 A2   7/2008

OTHER PUBLICATIONS

Johnston, Michael,"Independent Film Does Have a Future," Street Punk Productions, Aug. 13, 2013, retrieved on May 12, 2014 from http://www.street-punk-productions.com/category/independent-film/, 3 pages.
(Continued)

*Primary Examiner* — Mushfikh I Alam

(57) ABSTRACT

Provisioning commercial-free or break-free media content. Example types of media or media content may include advertising media, broadcast media, social media, news media, and etc. In a satellite broadcast television implementation, subscribers may be provided the ability to search for and optionally access commercial-free programming.

20 Claims, 8 Drawing Sheets

Related U.S. Application Data continuation of application No. 14/274,389, filed on May 9, 2014, now Pat. No. 10,003,858.

(51) Int. Cl.
  *H04N 21/431* (2011.01)
  *H04N 21/2668* (2011.01)
  *H04N 21/2665* (2011.01)
  *H04N 21/433* (2011.01)
  *H04N 21/462* (2011.01)
  *H04N 21/4722* (2011.01)
  *H04N 21/482* (2011.01)
  *H04N 21/45* (2011.01)
  *H04N 21/472* (2011.01)
  *H04N 21/432* (2011.01)
  *H04N 21/4782* (2011.01)
  *H04N 21/4788* (2011.01)

(56) References Cited

U.S. PATENT DOCUMENTS

| | | | |
|---|---|---|---|
| 6,973,012 | B2 | 12/2005 | Kondo |
| 7,164,798 | B2 | 1/2007 | Hua et al. |
| 7,240,359 | B1 | 7/2007 | Sie et al. |
| 7,982,797 | B2 | 7/2011 | Zhang |
| 8,321,466 | B2 | 11/2012 | Black et al. |
| 8,326,121 | B2 | 12/2012 | Roberts et al. |
| 8,365,234 | B2 | 1/2013 | Coles et al. |
| 8,402,556 | B2 | 3/2013 | Bradley |
| 8,542,984 | B1 | 9/2013 | Knee et al. |
| 8,763,024 | B2 | 6/2014 | White |
| 8,997,150 | B2 | 3/2015 | Kilar et al. |
| 9,137,491 | B2* | 9/2015 | Corvin .......... G06Q 30/02 |
| 10,003,858 | B2 | 6/2018 | Austin |
| 2002/0010927 | A1 | 1/2002 | Kim |
| 2002/0083436 | A1 | 6/2002 | Fidler |
| 2002/0165770 | A1 | 11/2002 | Khoo et al. |
| 2003/0007777 | A1 | 1/2003 | Okajima et al. |
| 2003/0093790 | A1 | 5/2003 | Logan et al. |
| 2003/0228125 | A1 | 12/2003 | Trajkovic et al. |
| 2003/0233656 | A1 | 12/2003 | Sie et al. |
| 2004/0216156 | A1* | 10/2004 | Wagner .......... H04N 5/44543 725/39 |
| 2004/0250296 | A1 | 12/2004 | Fuisz |
| 2006/0107288 | A1 | 5/2006 | Huang et al. |
| 2006/0248209 | A1 | 11/2006 | Chiu et al. |
| 2006/0294571 | A1 | 12/2006 | Moore et al. |
| 2007/0154168 | A1 | 7/2007 | Cordray et al. |
| 2008/0127258 | A1 | 5/2008 | Walker et al. |
| 2008/0141317 | A1 | 6/2008 | Radloff et al. |
| 2008/0276278 | A1* | 11/2008 | Krieger .......... H04N 5/44543 725/40 |
| 2009/0055873 | A1 | 2/2009 | Kim et al. |
| 2009/0133052 | A1* | 5/2009 | Badt, Jr. .......... H04N 21/23424 725/32 |
| 2009/0249412 | A1 | 10/2009 | Bhogal et al. |
| 2009/0260040 | A1 | 10/2009 | Kritt et al. |
| 2009/0271817 | A1 | 10/2009 | White et al. |
| 2009/0320067 | A1 | 12/2009 | Thibodeau et al. |
| 2010/0299687 | A1 | 11/2010 | Bertino-Clarke |
| 2010/0332488 | A1 | 12/2010 | Horvitz et al. |
| 2011/0063317 | A1 | 3/2011 | Gharaat et al. |
| 2012/0297421 | A1 | 11/2012 | Kim et al. |
| 2013/0007045 | A1 | 1/2013 | Carroll et al. |
| 2013/0014169 | A1* | 1/2013 | Sansom .......... H04N 7/17318 725/48 |
| 2013/0031573 | A1 | 1/2013 | Zeidman |
| 2013/0031579 | A1 | 1/2013 | Klappert |
| 2013/0174191 | A1 | 7/2013 | Thompson et al. |
| 2013/0205343 | A1* | 8/2013 | Kirby .......... H04N 21/4307 725/51 |
| 2013/0211879 | A1* | 8/2013 | Holland .......... G06Q 30/0241 705/7.32 |
| 2013/0239145 | A1 | 9/2013 | Broome et al. |
| 2013/0347035 | A1 | 12/2013 | Tang et al. |
| 2014/0058812 | A1 | 2/2014 | Bender et al. |
| 2014/0082645 | A1 | 3/2014 | Stern et al. |
| 2014/0196090 | A1 | 7/2014 | Kataoka et al. |
| 2014/0196094 | A1 | 7/2014 | Singh et al. |
| 2014/0214512 | A1 | 7/2014 | Bachman |
| 2014/0215529 | A1 | 7/2014 | Good et al. |
| 2014/0280501 | A1 | 9/2014 | Turner, Jr. |
| 2014/0282676 | A1 | 9/2014 | Joergens |
| 2014/0282742 | A1 | 9/2014 | Demsey et al. |
| 2014/0325547 | A1* | 10/2014 | Roberts .......... G06Q 30/00 725/14 |
| 2014/0359667 | A1 | 12/2014 | Kilar et al. |
| 2014/0380354 | A1* | 12/2014 | Relyea .......... H04N 21/44222 725/32 |
| 2015/0007223 | A1* | 1/2015 | Molinie .......... H04N 21/4126 725/37 |
| 2015/0026728 | A1 | 1/2015 | Carter et al. |
| 2015/0046951 | A1 | 2/2015 | Arunachalam et al. |
| 2015/0082356 | A1 | 3/2015 | Naito et al. |
| 2015/0163560 | A1 | 6/2015 | Holley et al. |
| 2015/0208131 | A1 | 7/2015 | Chatter et al. |
| 2015/0245081 | A1 | 8/2015 | Cook |
| 2015/0304698 | A1* | 10/2015 | Redol .......... H04N 21/854 725/23 |
| 2015/0312643 | A1 | 10/2015 | Walker et al. |
| 2015/0324827 | A1 | 11/2015 | Upstone et al. |
| 2015/0326891 | A1* | 11/2015 | Austin .......... H04N 21/23109 725/53 |
| 2015/0332730 | A1* | 11/2015 | Bohra .......... H04N 21/812 386/241 |
| 2015/0356624 | A1 | 12/2015 | Itwaru |

OTHER PUBLICATIONS

U.S. Appl. No. 14/274,389, filed May 9, 2014, Non-Final Rejection dated Jul. 31, 2015, all pages.
U.S. Appl. No. 14/274,389, filed May 9, 2014, Final Rejection dated Feb. 1, 2016, all pages.
U.S. Appl. No. 14/274,389, filed May 9, 2014, Non-Final Rejection dated May 13, 2016, all pages.
U.S. Appl. No. 14/274,389, filed May 9, 2014, Final Rejection dated Nov. 9, 2016, all pages.
U.S. Appl. No. 14/274,389, filed May 9, 2014, Non-Final Rejection dated Feb. 17, 2017, all pages.
U.S. Appl. No. 14/274,389, filed May 9, 2014, Final Rejection dated Jul. 18, 2017, all pages.
U.S. Appl. No. 14/274,389, filed May 9, 2014, Notice of Allowance dated Jan. 17, 2018, all pages.

* cited by examiner

PROVISIONING COMMERCIAL-FREE MEDIA CONTENT

CROSS-REFERENCE TO RELATED APPLICATIONS

This application is a continuation of U.S. application Ser. No. 15/972,689, filed May 7, 2018, which is a continuation of U.S. application Ser. No. 14/274,389, filed May 9, 2014, each of which is herein incorporated by reference in its entirety for all purposes.

BACKGROUND

The advent of the digital video recorder and the availability of high-capacity and affordable computer-readable storage devices have made available many possibilities to television programming service providers and viewers alike. In addition, television viewers have come to expect flexibility and convenience with respect to the recording and accessing of recorded content via their television receivers.

SUMMARY

In an embodiment, a method may include or comprise receiving by a television receiver a search string of one or more keywords to identify instances of media content matched with the one or more keywords. The method may include or comprise querying by the television receiver an electronic programming guide database and at least one recorded content database to identify instances of media content matched with the one or more keywords. The method may include or comprise outputting by the television receiver for display by a presentation device a particular selectable identifier associated with each instance of media content that is matched with the one or more keywords and that is identified as commercial-free.

In an embodiment, a television receiver may include or comprise one or more processors, and a memory communicatively coupled with and readable by the one or more processors and having stored therein processor-readable instructions. The instructions when executed by the one or more processors may cause the one or more processors to detect a query to identify instances of content matched with the query. The instructions when executed by the one or more processors may cause the one or more processors to access an electronic programming guide database and at least one recorded content database to identify instances of content matched with the query. The instructions when executed by the one or more processors may cause the one or more processors to output for display by a presentation device a particular selectable identifier associated with each instance of content that is matched with the query and that is identified as break-free.

In an embodiment, a method for provisioning commercial-free content may include or comprise receiving at least one keyword to identify instances of media content. The method for provisioning commercial-free content may include or comprise querying an electronic programming guide database and at least one recorded content database to identify instances of media content matched with the at least one keyword. The method for provisioning commercial-free content may include or comprise selecting commercial-free instances of media content matched with the at least one keyword based upon a particular flag or bit associated with each instance of commercial-free content. The method for provisioning commercial-free content may include or comprise outputting for display by a presentation device a particular selectable identifier associated with each instance of media content that is matched with the at least one keyword and that is identified as commercial-free. The method for provisioning commercial-free content may include or comprise detecting an indication of selection of a selectable identifier and one of outputting for display by the presentation device a particular instance of commercial-free media content that is associated with the selectable identifier and an option to set a timer to record a particular instance of commercial-free media content that is associated with the selectable identifier.

Other embodiments are possible.

DETAILED DESCRIPTION

The present disclosure is directed to or towards systems and methods for provisioning commercial-free or break-free media content. Example types of media or media content may include advertising media, broadcast media, social media, news media, and etc. Accordingly, it is contemplated that the principles of the present disclosure may be applicable in or to many different types of scenarios or implementations. For example, in the context of satellite broadcast television, subscribers may be provided the ability to search for and optionally access commercial-free satellite broadcast programming. For example, a user interface, such as an EPG (Electronic Programming Guide), may be accessed to search for certain content of interest. For example, a query term or string "Action and Russell and Carpenter" may be entered into a text field and then "Enter" may be selected. It is contemplated that results that are returned only include options that are commercial-free. For example, if the movie Big Trouble in Little China is scheduled to air at 7 PM on a commercial broadcast television network, is scheduled to air at 7 PM on a premium cable and satellite television network, and is also stored as a commercial-free recording, then only results that identify the premium channel broadcast and the commercial-free recording are returned. It is further contemplated that a subscription to the premium cable and satellite television network need not necessarily exist.

Subsequently, a user could optionally select a particular returned result. If the result is currently available for viewing, then an option may be presented to allow the user to watch corresponding content. If the result is currently unavailable for viewing, then an option may be presented to allow the user to set a timer to record corresponding content. If access to content is not currently authorized, such as when a valid subscription to the premium cable and satellite television network does not exist, then an option may be presented to allow the user to at least temporarily gain access to the corresponding content, for a fee. On the back-end, a mechanism may be implemented to filter-out results associated with content that includes commercials. For example, a flag or bit linked to each instance of content as metadata may be used to indicate or identify content that includes, or not, one or more commercials or advertising segments. Although not so limited, an appreciation of the various aspects of the present disclosure may be gained from the following discussion in connection with the drawings.

Figure 1:
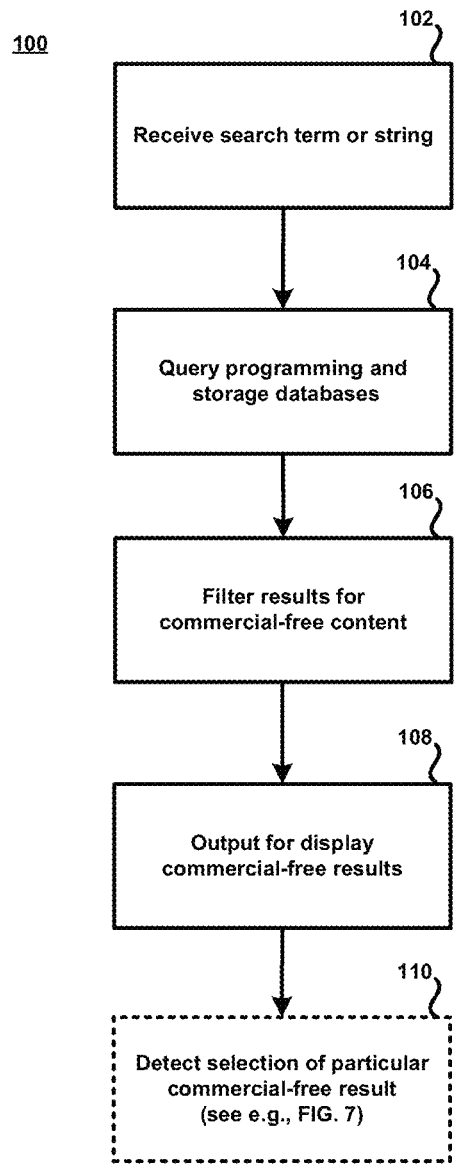
FIG. 1 shows a first example method in accordance with the disclosure.

For instance, referring now to FIG. 1, a first example method 100 is shown in accordance with the disclosure. At step 102, a television receiver may receive a search term or string for content of interest. For example, a query string "Action and Russell and Carpenter" may be entered into a text field within an EPG as displayed on a television screen, and then a particular radio button may be selected to instantiate a search for content that may matched, at least to a certain degree or extent, to one or more terms of the string. Next, at step 104, the television receiver may implement the search by querying one or more programming and/or data storage databases. For example, the television receiver may query an EPG database to identify any instance of programming that is scheduled for broadcast and that also may be matched to the query string "Action and Russell and Carpenter." In another example, the television receiver may query a local and/or non-local look-up table to identify any recorded instance of programming that may be matched to the example search string.

In the example embodiment, it is contemplated that various types or forms of metadata may be intrinsically associated with (i.e., "tagged") any particular instance of programming, so that a television receiver may discover programming that may be matched to any particular query term or string. Similarly, it is contemplated that various types or forms of metadata may be intrinsically associated with any particular instance of programming so that a television receiver may discover programming that is "commercial-free." The term or phrase "commercial-free," and the like, may refer to content that is devoid of any advertising or similar break in content, and instead may refer to content that is continuous in time starting from the beginning of the content through to the end thereof. An example of such commercial-free content, aside from clever product placement, may include a movie that is presented in a motion-picture theatre. It will be appreciated that other types of commercial-free content are possible.

Next, at step 106, the television receiver may filter returned results so as to only keep or maintain results that are commercial-free. For example, the television receiver may parse and/or access metadata associated with all returned results or programming matched to the query string "Action and Russell and Carpenter," and ignore or discard those results that are linked with a flag or bit used to indicate or identify content that includes commercial or advertising content. For example, it is contemplated that the movie Big Trouble in Little China may be matched to the query string "Action and Russell and Carpenter," and if an instance of that movie is identified as scheduled to air at a particular time on a commercial broadcast television network, is identified as scheduled to air at a particular time on a premium cable and satellite television network, and is also identified as stored as a commercial-free recording, then the instance of that movie scheduled to air on the commercial broadcast television network may initially be identified as including commercial content, and then may be discarded from the search results. In this manner, only those results that are commercial-free are maintained.

Next, at step 108, the television receiver may output for display by a television or handheld mobile device, for example, all returned results that are determined or identified as commercial-free at step 106, and at step 110 the television receiver may detect selection of a particular instance of a returned commercial-free result, as discussed in further detail throughout. In this manner, the example method 100 of FIG. 1 as implemented may enable the provisioning of commercial-free media content. Such an implementation may be beneficial and/or advantageous in many respects. For example, viewer QoE (Quality of Experience) may be substantially increased by providing a mechanism for avoiding annoying and/or disrupting commercial interruptions.

Further, it is contemplated that it does not necessarily have to be a search string used to find commercial-free results, instead it could be a filter that you select to show only commercial-free events of a particular theme like Action or Fantasy. Also it could be done by browsing a network, for example, one could enter a browse screen and then select a commercial-free network list maybe consisting of HBO®, Showtime®, Cinemax®, and etc. Then select a commercial free network from the list like HBO® and then look through the list of events. Additional scenarios and beneficial aspects associated with provisioning commercial-free media content are described in detail below in connection with FIGS. 2-8.

Figure 2:
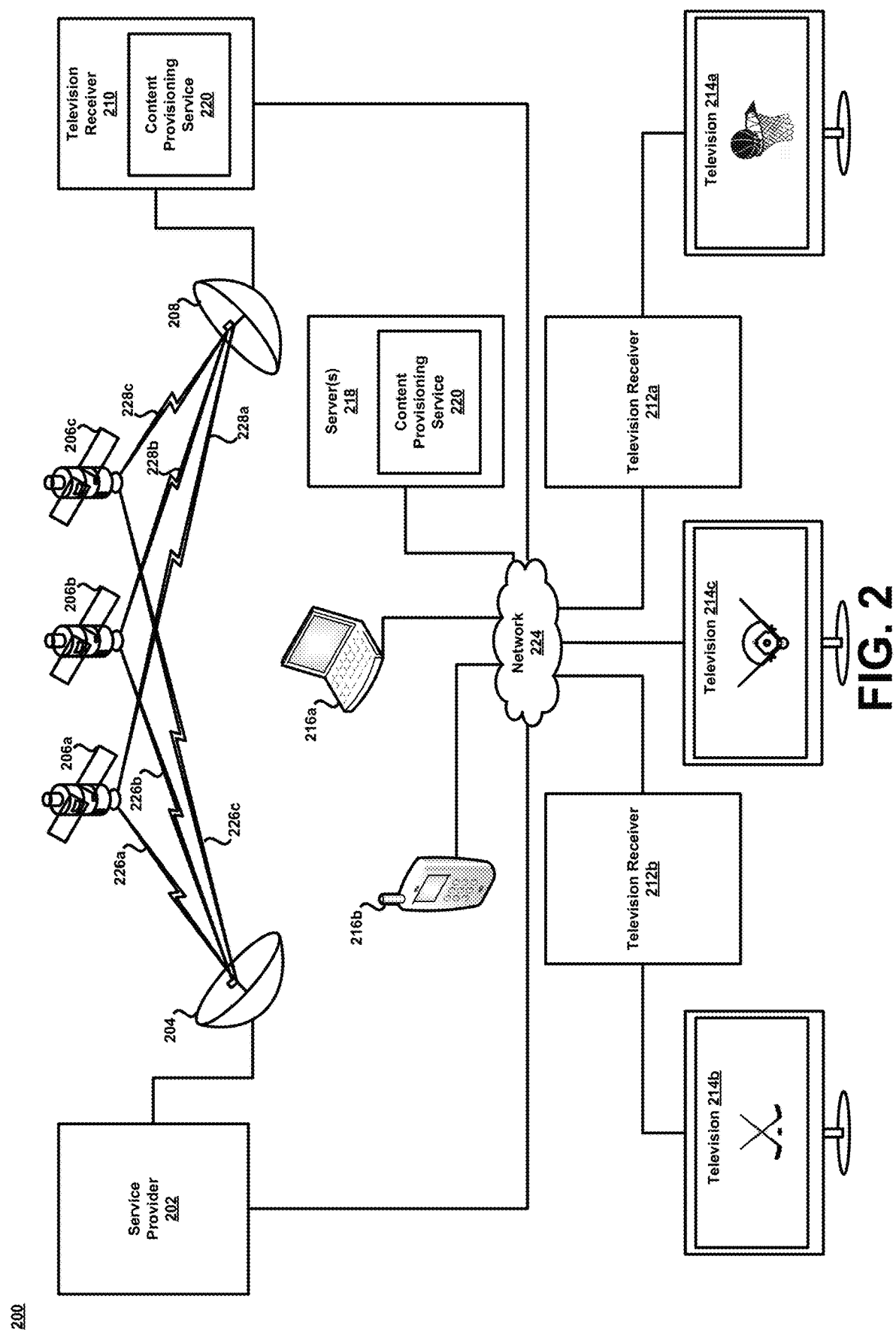
FIG. 2 shows an example satellite broadcast system in accordance with the disclosure.

For instance, referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of distribution system as desired.

The example system 200 may include a service provider 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*, and at least one server 218 that may be associated with the service provider 202. Additionally, the PTR 210 and/or server 218 may include a CPS (Content Provisioning Service) module 220. In general, the CPS module 220 may be configured and arranged to implement various features associated with provisioning commercial-free media content, as discussed throughout this disclosure. Such features may, among other things, serve to entice new customers to subscribe to services as offered by a particular satellite television provider, as well as provide an incentive for existing customers to maintain their loyalty and/or relationship with the particular provider. Still other benefits and/or advantages are possible as well, and an appreciation of such benefits and/or advantages may be understood in light of the present disclosure in its entirety.

The system 200 may further include at least one network 224 that establishes a bidirectional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular network, or any other type of communication network configured such that data may be transferred between and among respective elements of the system 200.

The PTR 210, and the STRs 212*a-b*, as described throughout may generally be any type of television receiver, television converter, etc., such as a STB for example. In another example, the PTR 210, and the STRs 212*a-b*, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212*a-b* and televisions 214*a-c*, and possibly the computing devices 216*a-b*, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 200 may be configured to communicate in accordance with the MoCA® (Multimedia over Coax Alliance) home entertainment networking standard. Still other embodiments are possible.

In practice, the satellites 206*a-c* may each be configured to receive uplink signals 226*a-c* from the satellite uplink 204. In this example, each the uplink signals 226*a-c* may contain one or more transponder streams of particular data or content, such as one or more particular television channels, as supplied by the service provider 202. For example, each of the respective uplink signals 226*a-c* may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206*a-c*.

Further, different media content may be carried using different transponders of a particular satellite (e.g., satellite 206*a*); thus, such media content may be transmitted at different frequencies and/or different frequency ranges. For example, a first and second television channel may be carried on a first carrier frequency over a first transponder of satellite 206*a*, and a third, fourth, and fifth television channel may be carried on second carrier frequency over a first transponder of satellite 206*b*, or, the third, fourth, and fifth television channel may be carried on a second carrier frequency over a second transponder of satellite 206*a*, and etc. Each of these television channels may be scrambled such that unauthorized persons are prevented from accessing the television channels.

The satellites 206*a-c* may further be configured to relay the uplink signals 226*a-c* to the satellite dish 208 as downlink signals 228*a-c*. Similar to the uplink signals 226*a-c*, each of the downlink signals 228*a-c* may contain one or more transponder streams of particular data or content, such as various encoded and/or at least partially electronically scrambled television channels, on-demand programming, etc., in accordance with an allotted carrier frequency and bandwidth. The downlink signals 228*a-c*, however, may not necessarily contain the same or similar content as a corresponding one of the uplink signals 226*a-c*. For example, the uplink signal 226*a* may include a first transponder stream containing at least a first group or grouping of television channels, and the downlink signal 228*a* may include a second transponder stream containing at least a second, different group or grouping of television channels. In other examples, the first and second group of television channels may have one or more television channels in common. In sum, there may be varying degrees of correlation between the uplink signals 226*a-c* and the downlink signals 228*a-c*, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 208 may be provided for use to receive television channels (e.g., on a subscription basis) provided by the service provider 202, satellite uplink 204, and/or satellites 206*a-c*. For example, the satellite dish 208 may be configured to receive particular transponder streams, or downlink signals 228*a-c*, from one or more of the satellites 206*a-c*. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other embodiments are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or both of the computing device 216a-b. Similar to the above-examples, the television channel may generally be presented live, or from a recording as previously stored on the PTR 210, and may be output to one or both of the computing devices 216a-b in accordance with a particular content protection technology and/or networking standard.

Figure 3:
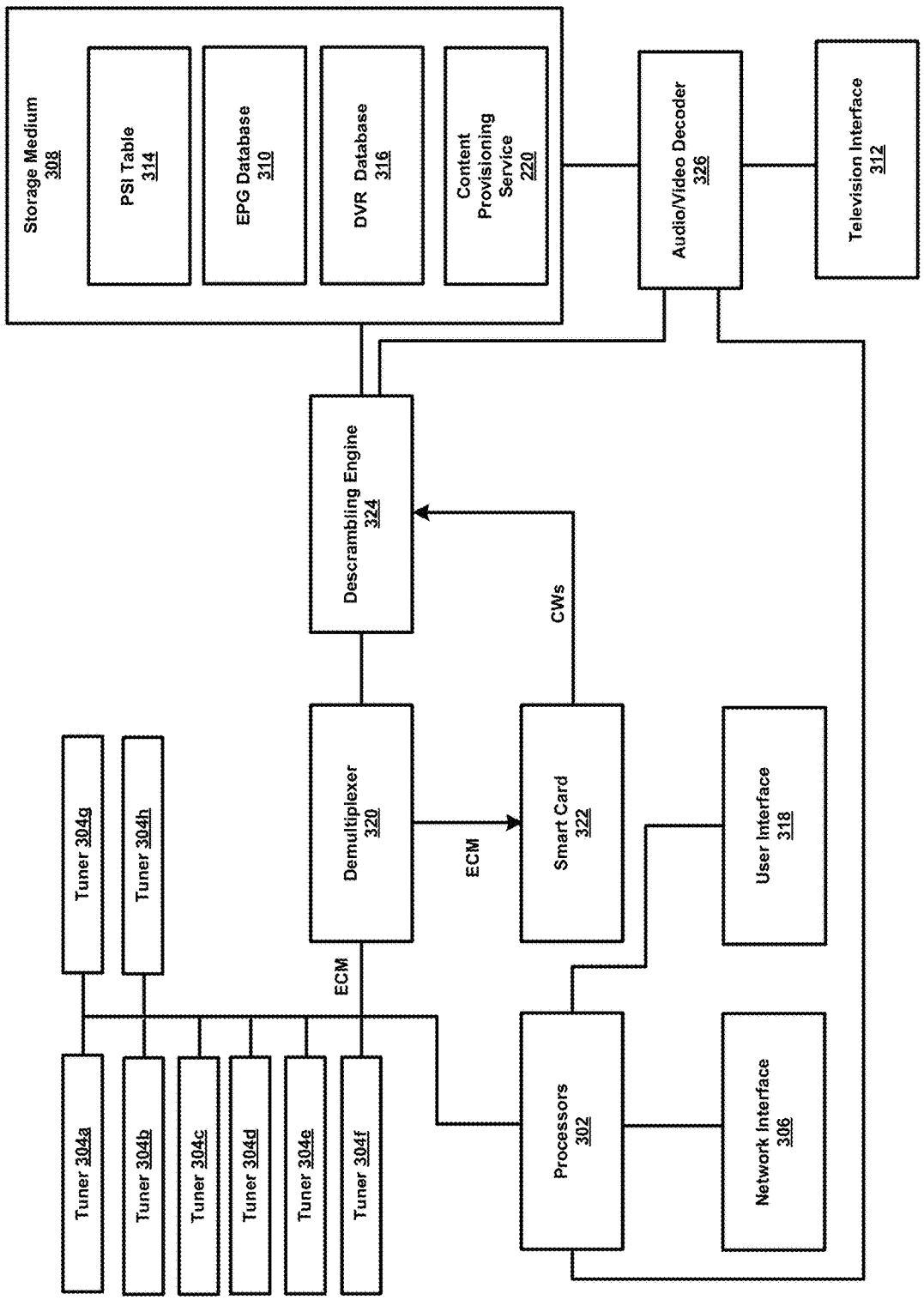
FIG. 3 shows an example block diagram of a television receiver.

Referring now to FIG. 3, an example block diagram of the PTR 210 of FIG. 2 is shown in accordance with the disclosure. In some embodiments, STRs 212a-b may be configured in a manner similar to that of the PTR 210. In some embodiments, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other embodiments, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206a-c, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the CPS module 220 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 314 may be divided into a number of tables, such as a NIT (Network Information Table), a PAT (Program Association Table), a PMT (Program Management Table), etc.

Table 1 below provides a simplified example of the PSI table 314 for several television channels. It should be understood that in other embodiments, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some embodiments, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user, e.g., an individual who is associated with the PTR 210, has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some embodiments, from each ECM received by the smart card 322, two control words are obtained. In some embodiments, when the smart card 322 receives an ECM, it compares the ECM to the previously received ECM. If the two ECMs match, the second ECM is not decrypted because the same control words would be obtained. In other embodiments, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304*a-h* may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the CPS module 220 as mentioned above in connection with FIG. 2. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
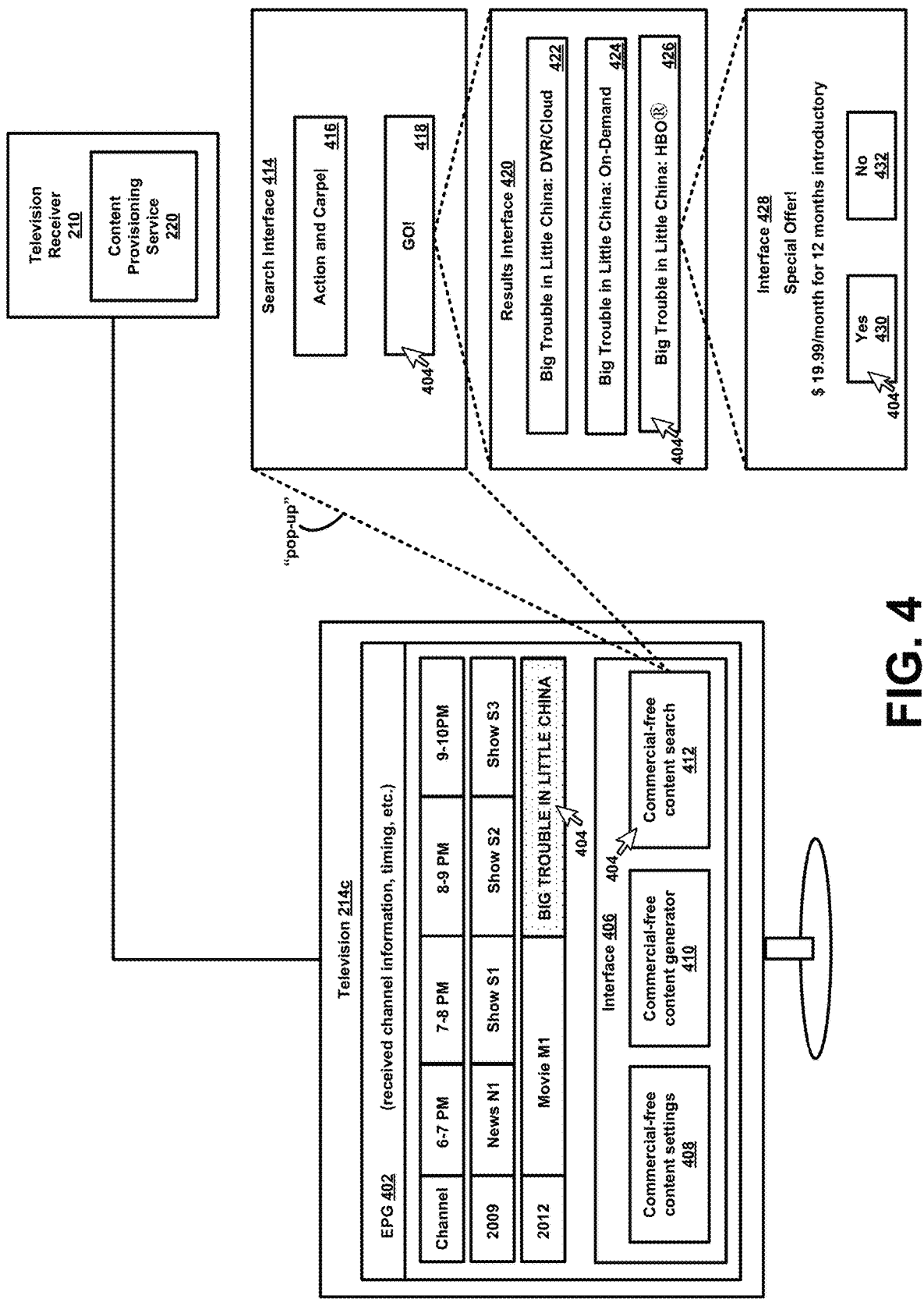
FIG. 4 shows first example aspects of the system of FIG. 2 in detail.

Referring now to FIG. 4, first aspects of the example system 200 of FIG. 2 are shown in detail. In particular, the PTR 210 may be configured to output an EPG 402 to and for presentation the television 214*c*, for example. In general, the EPG 402 may at least present various information related to television channels and the timing of programs or programming appearing on such television channels. For example, as shown in FIG. 4, the EPG 402 may display information associated with a channel 2012 where the movie Big Trouble II Little China is listed as scheduled to appear on that channel starting at a particular time on a particular day, and etc. In this example, and assuming that a current time is sometime during the time period 8-10 PM, a viewer may manipulate a cursor 404 using a pointing device (not shown) to select, as shown by stipple shading in FIG. 4, the movie Big Trouble In Little China for immediate viewing. Other embodiments are possible. For example, it is contemplated that any menu-driven navigation technique may be used to enable user-interaction with the EPG 402, along with other elements or interfaces output by the PTR 210 to the television 214*c*.

In addition to the EPG 402, the PTR 210 may be configured to output various other interactive elements or interfaces in accordance with the disclosure. For example, the CPS module 220 may be configured to output a first interface 406 that includes a first selection 408, a second selection 410, and a third selection 412. Features or functionality associated with the first selection 408 and the second selection 410 are discussed in detail below. The third selection 412 though may in general when selected instantiate a process or algorithm whereby a user or viewer may search and/or access particular commercial-free content. For example, a user may manipulate the cursor 404 to select the third selection 412, via a "point and double-click" action, for example, and in response the CPS module 220 may be configured to output a search interface 414 to and for presentation by the television 214*c*.

In this example, the search interface 414 may permit a user to enter a search term or string, and then implement or instantiate a query against the search term or string for the purpose of identifying matched content that is commercial-free. For example, the search interface 414 may include a text field 416 and a button 418, where the search string "Action and Carpenter and Russell" may be entered into the text field 416, and then the button 418 may be selected to instantiate a search for content that may matched to at least one or more terms of that search string. In response, CPS module 220 may implement the search by querying one or more programming and/or data storage databases. For example, the CPS module 220 may query the EPG database 310 of FIG. 3 to identify any instance of programming that is scheduled for broadcast, and that also may be matched to the search string "Action and Carpenter and Russell." In another example, the CPS module 220 may query one or more databases, such as the DVR database 316 of FIG. 3 and/or the server 218 of FIG. 2, to identify any recorded instance of programming that may be matched to the string "Action and Carpenter and Russell."

In the present example, the CPS module 220 may initially filter returned results so as to only keep or maintain results that are commercial-free. For example, the CPS module 220 may parse and/or access metadata associated with all returned results or programming matched to the search string "Action and Carpenter and Russell," and ignore or discard those results that are linked with a flag or bit that is used to indicate or identify content that includes commercial or advertising content. For example, it is contemplated that at least the movie Big Trouble in Little China may be matched to the search string "Action and Carpenter and Russell," and if an instance of that movie is identified as scheduled to air at a particular time on a commercial broadcast television network (e.g., CBS®), is identified as scheduled to air at a particular time on a premium cable and satellite television network (e.g., HBO®), and is also identified as stored as a commercial-free recording, then the instance of that movie scheduled to air on the commercial broadcast television network may initially be identified as including commercial content, and then may be discarded from the search results. In this manner, only those results that are commercial-free are maintained or returned for optional selection or access.

For example, referring still to FIG. 4, the CPS module 220 may output a results interface 420 that includes a plurality of returned, filtered results in response to the search string "Action and Carpenter and Russell." In this example, the results interface 420 specifies a first result 422 as "Big Trouble in Little China: DVR/Cloud" that identifies the source of that particular instance of the movie as being available from one or both of "DVR" and "Cloud" (e.g., in a cloud-computing implementation), a second result 424 as "Big Trouble in Little China: On-demand" that identifies the source of that particular instance of the movie as being available via on-demand, and a third result 426 as "Big Trouble in Little China: HBO®" that identifies the source of that particular instance of the movie as being available from "HBO®." In general, it is contemplated that a user may manipulate the cursor 404 to select any one of the first result 422, the second result 424, and the third result 426 as desired (or not) so as to allow the user or to access a particular instance of the movie from a corresponding source.

For example, the third result 426 may be selected as shown in FIG. 4, which may be immediately output for display by the television 214c, for example, assuming that the CPS module 220 verifies or confirms that an account associated with a subject user or viewer indicates that content made available by HBO® is authorized as accessible, e.g., a corresponding subscription exists. In event that the account associated with the subject user indicates that content made available by HBO® is not authorized as accessible, e.g., a subscription does not exist, it is contemplated that the CPS module 220 may output another interface 428 that includes a Yes selection 430 that when selected indicates to the CPS module 220 that the user agrees to terms and/or conditions set forth within the interface 428, so as to enable immediate access to the particular commercial-free instance of the movie. Alternatively, a No selection 432 when selected may indicate to the CPS module 220 that the user does not agree to terms and/or conditions set forth within the interface 428, and then the interface 428 may be "closed" allowing control to revert to the results interface 420. It is contemplated that an interface similar to the interface 428 may be presented when the second result 424 is selected, e.g., including terms for access, options for agreement/disagreement to the terms, etc. Similarly, an interface similar to the interface 428 may be presented when the first result 422 is selected and access to recorded content is available only for a fee, e.g., when a particular recorded instance of content is not owned or is to be crowd-sourced, or not at least already stored to DVR database 316.

The aspects discussed in connection with FIG. 4 are examples only, and many other embodiments are possible. For example, instead of instantiating the search via the search interface 414, the CPS module 220 may be configured or pre-configured so that upon an initial detection of a "highlighting" or "selection" of the movie Big Trouble In Little China within the EPG 402 (e.g., not a selection for immediate viewing but rather a simple identification of that movie such as shown by stipple shading in FIG. 4), and then upon detection of "selection" of the third selection 412, a search may be implemented directly against the terms "Big and Trouble and In and Little and China." Additionally, it contemplated that all returned results may not necessarily identify only a single result such as Big Trouble In Little China in the present example, which is simplified for explanation purposes. For example, in response to the search string "Action and Carpenter and Russell" a number of results associated with the movie Escape from New York may additionally be returned. Still further, it is contemplated that the format of the results interface 420 may be user-configurable according to user preferences.

Figure 5:
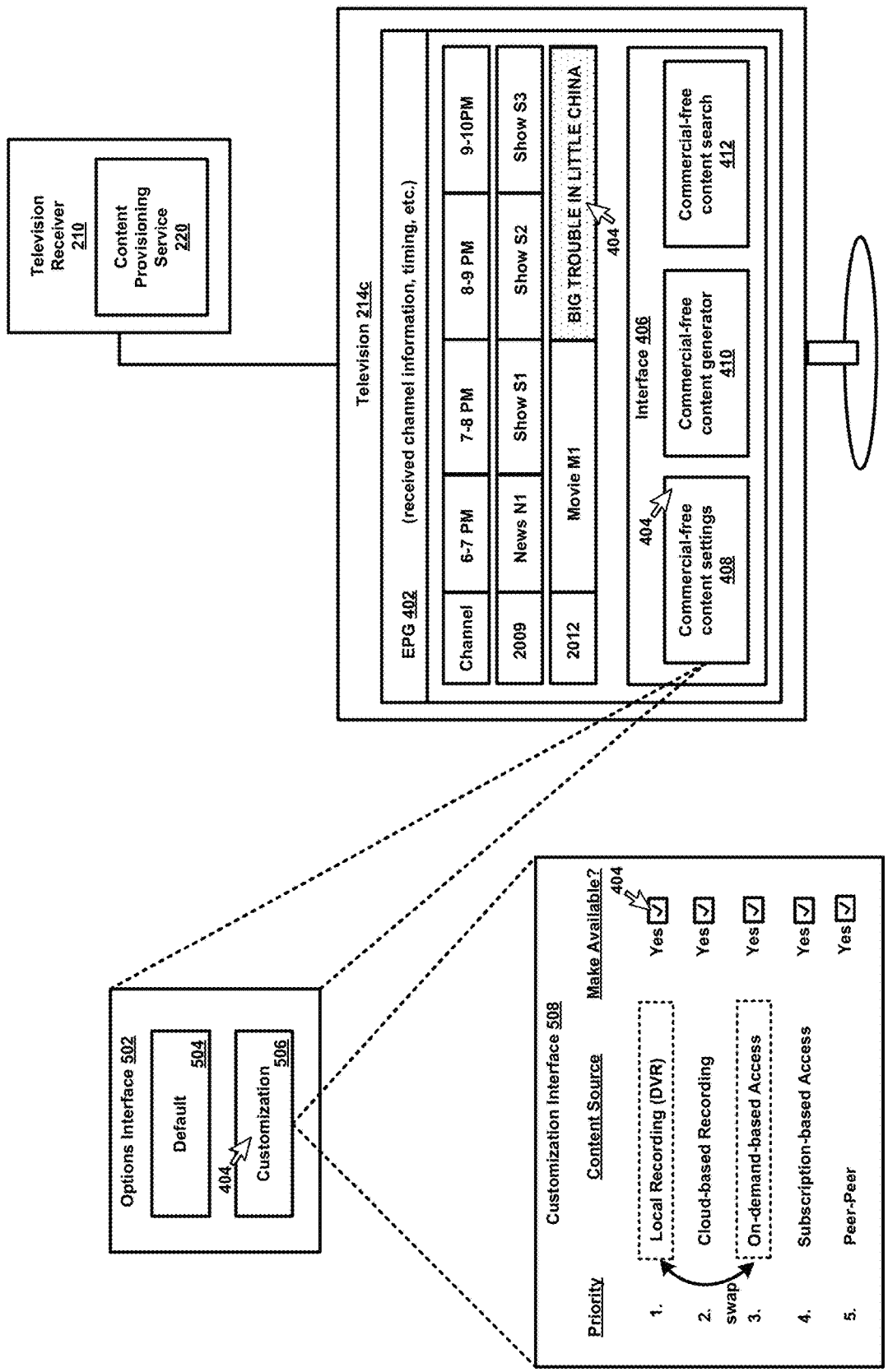
FIG. 5 shows second example aspects of the system of FIG. 2 in detail.

For example, referring now to FIG. 5, second aspects of the example system 200 of FIG. 2 are shown in detail. In particular, as mentioned above, the CPS module 220 may be configured to output within the first interface 406 the first selection 408 and the second selection 410, in addition to the third selection 412. In this example, the first selection 408 may in general when selected instantiate a process or algorithm whereby a user or viewer may configure the CPS module 220 to output the results interface 420 according to user-specific preferences. For example, a user may manipulate the cursor 404 to select the first selection 408 and, in response, the CPS module 220 may be configured to output an options interface 502 to and for presentation by the television 214c.

In this example, the options interface 502 may permit a user to configure the CPS module 220 to output the results interface 420 in accordance with a default or customized form or format. For example, the options interface 502 may include a default selection 504 and a customization selection 506. It is contemplated that the CPS module 220 may, when it is detected that the default selection 504 has been selected, output the results interface 420 in a manner similar to that shown in FIG. 4, where the first result 422, the second result 424, and the third result 426 are displayed in no particular order, preferred or otherwise. The CPS module 220 may however be configured to output a customization interface 508 to and for presentation by the television 214c when it is detected by the CPS module 220 that the customization selection 506 has been selected. It is contemplated that the customization interface 508 may permit a user to select and define which content sources are preferred for inclusion within the results interface 420, and their "priority," for provisioning commercial-free or break-free media content.

For example, the customization interface 508 may include or specify a number of content source options including, but not limited to: "Local Recording (DVR)"; "Cloud-based Recording"; "On-demand-based Access"; "Subscription-based Access"; and "Peer-Peer." In this example, the "Local Recording (DVR)" identifier may specify a content source option associated with a local DVR accessible to the PTR 210 of FIG. 2; the "Cloud-based Recording" identifier may specify a content source option associated with the server 218 of FIG. 2; the "On-demand-based Access" identifier may specify a content source option associated with an on-demand service offered by or through at least the service provider 202 of FIG. 2; the "Subscription-based Access" identifier may specify a content source option associated with a premium cable and satellite television network service offered by or through at least the service provider 202 of FIG. 2; and the "Peer-Peer" identifier may specify a content source option offered by or through at least the service provider 202 of FIG. 2, whereby a first television receiver associated with a particular account may transfer content directly to another television receiver not necessarily associated with the same account, e.g., in a crowd-sourcing implementation.

Referring still to the customization interface 508, in a first aspect it is contemplated that a "Yes" selection, or the like, may be displayed within the customization interface 508 adjacent each one of the content source options so that a user may have an opportunity to opt-in to at least each of those respective options as listed within the customization interface 508. For example, as shown in FIG. 5, each of the content source options have been opted-in to or selected so that the results interface 420 as shown in FIG. 4 when generated would include each of the selected content source options, assuming that a particular instance of content is available from each of the selected content source options.

In a second aspect, it is contemplated that a user may have an opportunity to define a priority for each of the selected content source options, so that when generated the results interface 420 as shown in FIG. 4 may list-out selected content source options in the preferred, prioritized order. For example, assuming that a particular instance of content is available from each of the selected content source options shown in FIG. 5, the results interface 420 when generated may list results in the order: Priority 1: "Big Trouble in Little China: DVR"; Priority 2: "Big Trouble in Little China: Cloud"; Priority 3: "Big Trouble in Little China: On-demand"; Priority 4: "Big Trouble in Little China: Subscription." Priority 5: "Big Trouble in Little China: Peer-Peer." Many other embodiments are possible.

Further, and as mentioned above, the first interface 406 may include the second selection 410. In this example, the second selection 410 may in general when selected instantiate a process or algorithm whereby the CPS module 220 may access a particular instance of recorded content accessible to the PTR 210, and generate a commercial-free version of that content, which may then subsequently be made available as commercial-free content for provisioning in a manner as described throughout. For example, assuming that the channel 2012 as listed within the EPG 402 shown in FIG. 5 presents instances of recorded content accessible to the PTR 210, it is contemplated that a viewer may manipulate the cursor 404 using a pointing device to "highlight" or "select" the movie Big Trouble In Little China via "point and single-click" action for example, and then select the second selection 410 via a "point and double-click" action for example. It is noted that listings with the EPG 402 may generally be considered wither linear or non-linear. A linear listing may refer to a listing of programs available on a particular channel in time, for example, News N1 from 6-7 PM, Show S1 from 7-8 PM, Show S3 from 8-9 PM, and so on. A non-linear listing may refer to a listing of recorded programs available to the PTR 210, for example, Movie M1 and movie Big Trouble In Little China, here though "time" is not a material parameter as those movies exist as recordings.

Continuing with example of selection of second selection 410 via a "point and double-click" action, in response, the CPS module 220 may be configured to access the recording of the Big Trouble In Little China and strip-out all commercial or advertising content so that that instance of the movie is commercial-free and available for access in accordance with the principles of the present disclosure. In addition, it is contemplated that the CPS module 220 may perform other operations on the data. This may further serve to entice new customers to subscribe to services as offered by a particular satellite television provider, as well as provide an incentive for existing customers to maintain their loyalty and/or relationship with the particular provider.

Figure 6:
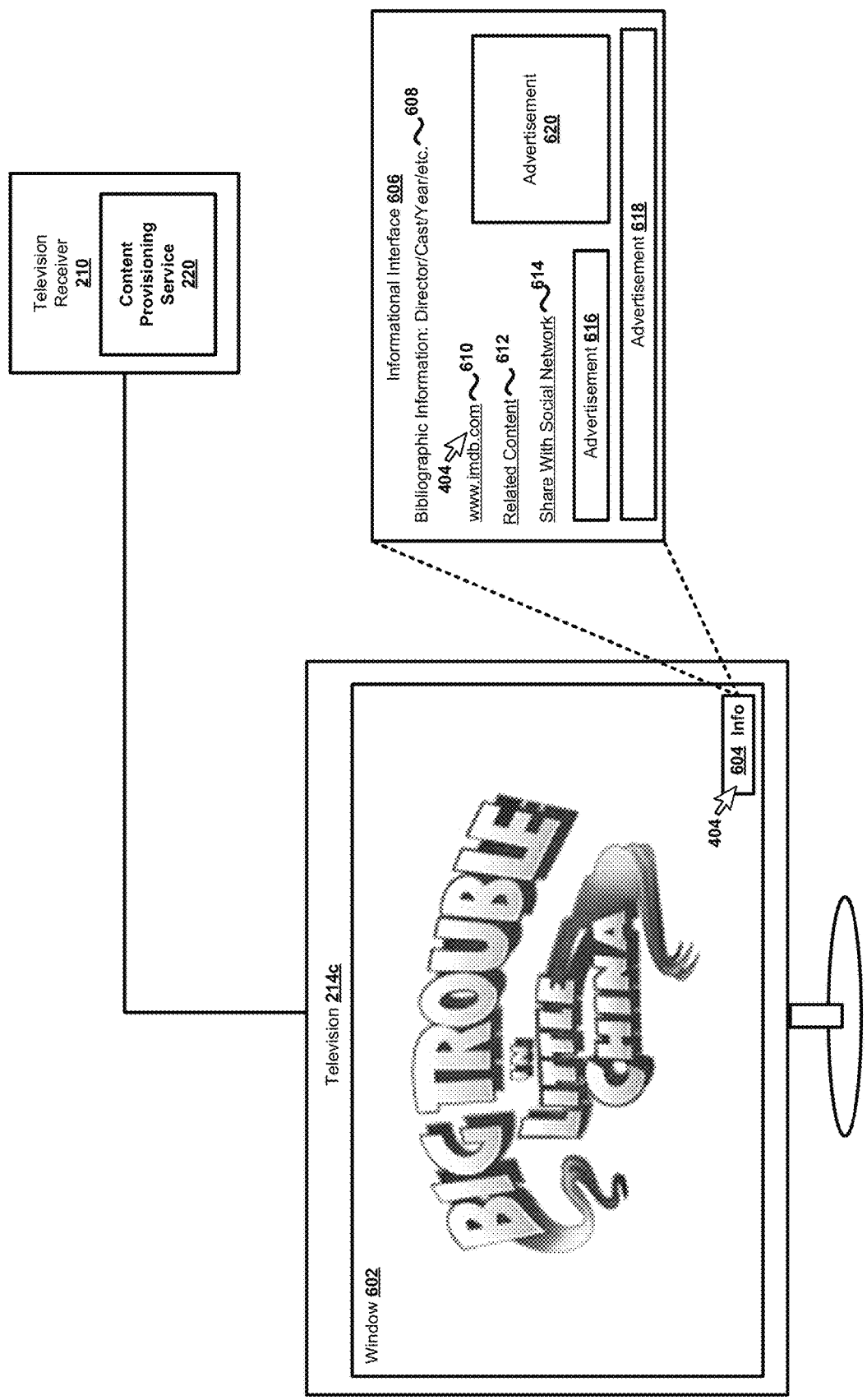
FIG. 6 shows third example aspects of the system of FIG. 2 in detail.

For example, referring now to FIG. 6, third aspects of the example system 200 of FIG. 2 are shown in detail. Here, it is assumed that a viewer has selected the commercial-free version of Big Trouble In Little China as generated via selection of the second selection 410 discussed above in connection with FIG. 5, for immediate viewing within a window 602 on the television 214c. In this example, a viewer may manipulate the cursor 404 to select an information button 604 to access an informational interface 606. In response, the CPS module 220 may be configured to output within the informational interface 606 various information associated with media content that is currently being displayed by the television 214c.

For example, the informational interface 606 may display bibliographic information 608, such as "Director/Cast/Year/etc.," associated with the movie Big Trouble In Little China that is currently being displayed by the television 214c. In some embodiments, the informational interface 606 may display a first hyperlink 610 to a website that includes additional content associated with the movie Big Trouble In Little China that is currently being displayed by the television 214c. When the first hyperlink 610 is selected a browser window may open-up and be displayed within the window 602 so that a viewer may navigate that website. In some embodiments, the informational interface 606 may display a second hyperlink 612 that when selected automatically or based on manual input downloads related content, such as a trailer or the like, for example, associated with a forthcoming sequel to the movie Big Trouble In Little China, e.g., Big Trouble In Little China 2.

In some embodiments, the informational interface 606 may display a third hyperlink 614 that when selected automatically or based-on manual input posts information (e.g., "This is the best movie ever") to a social network, such as Facebook or Twitter for example. In each of the examples discussed in connection with the informational interface 606, configuration information may have been previously supplied to the CPS module 220 (e.g., via customization interface 508) so that the CPS module 220 may implement respective actions. Further, it is contemplated that if or when posting information to a social network, certain information may be included in the post that identifies the services offered by the CPS module 220, so as to provide an advertisement for the provisioning of commercial-free or break-free media content as discussed in the context of the present disclosure. For instance, the text or sentence "This post was driven by services offered by: (Insert satellite content provider name here)" may also be posted thus providing an advertisement for that content provider on the social site so that others may be exposed to the service that is offered by the content provider.

In addition to the various information displayed within the informational interface 606 that is associated with media content that is currently being displayed by the television 214c, it is contemplated that the informational interface 606 may display one or more targeted advertisements, such as a first advertisement 616, a second advertisement 618, and a third advertisement 620 as shown in FIG. 6. It is contemplated that any one of the targeted advertisements displayed within the informational interface 606 may include a service or package offered by the service provider 202, as part of a campaign to sell that service or package. That service or package may be selected based on a deduction that any particular subscriber or customer who takes the time to access the informational interface 606 during the time that the media content is currently being output by the television 214c is being played is very likely to be interested in that type of media or media content.

For example, the first advertisement 616 may present a tailored, subscription-based package offered by the service provider 202 whose content is "All movies or other media content that have something to do with fantasy martial arts," and as part of a campaign to sell that package may include information about the package such as "This package is currently available at a discount of 25% off if subscribed to within the next 3 days." Many other embodiments are possible as well. For example, the second advertisement 618 may present an option to buy the most recent "Director's Cut" of the media content that is currently being output by the television 214c. In this example, the service provider 202 may charge a fee and thus derive revenue from a particular third party in return for presenting such an advertisement. Other embodiments are possible. For example, the third advertisement 620 may present an option to buy a ticket at a local movie theatre for a movie that is of related content. Again, the service provider 202 may charge a fee and thus derive revenue from a particular third party in return for presenting such an advertisement. Still other embodiments are possible as well.

Figure 7:
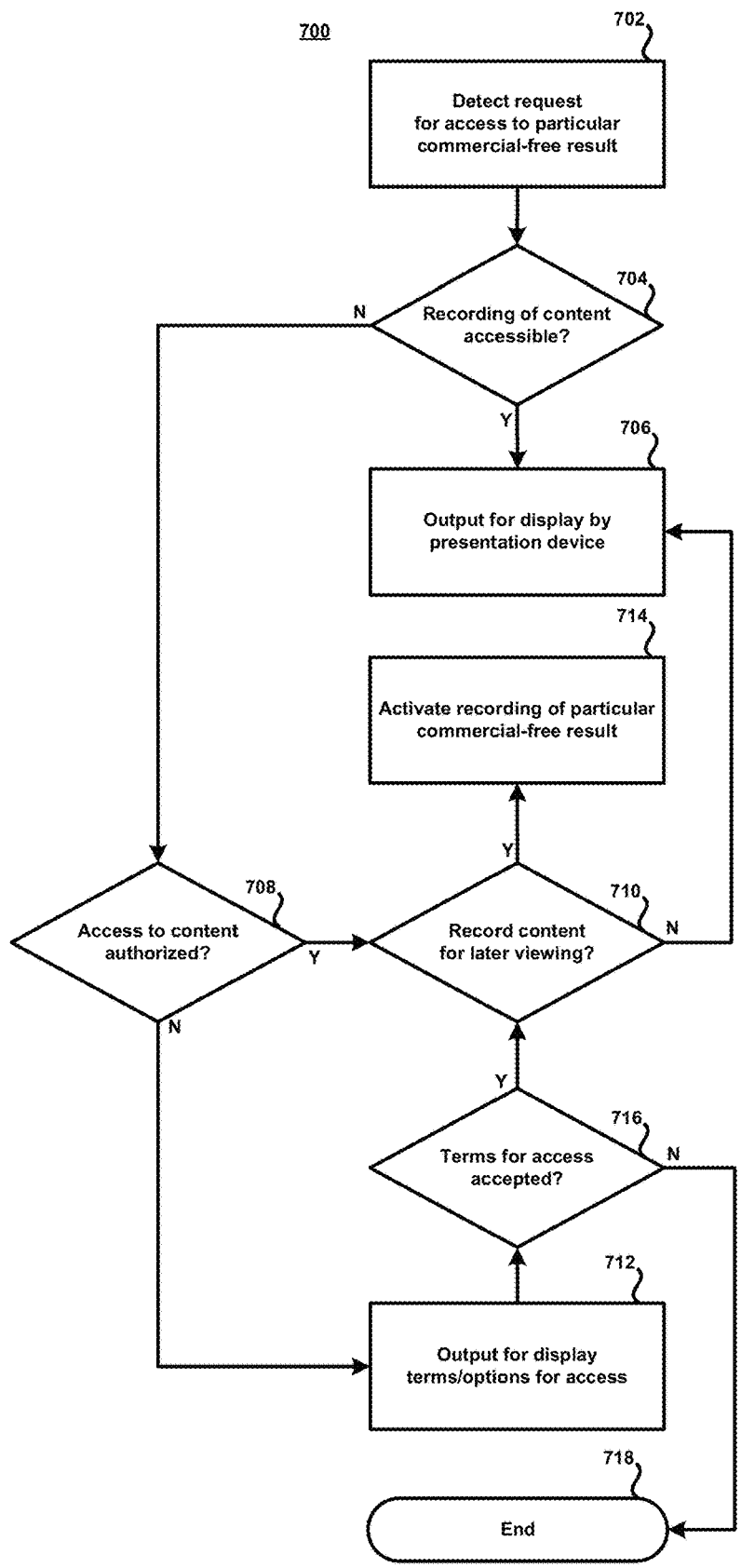
FIG. 7 shows a second example method in accordance with the disclosure.

Referring now to FIG. 7, a second example method 700 is shown in accordance with the disclosure. The various steps or modules of the method 700 may be performed by the PTR 210 of FIG. 2. Other embodiments are possible. For example, one or more various steps or modules of the method 700 may be performed by one or more of the other elements of FIG. 2.

In general, the example method 700 is a preference-driven process for provisioning commercial-free content. It is contemplated that one or more steps of the example method 700 may supplement one or more of the steps or features as discussed above in connection with at least FIG. 4 and FIG. 5. For example, at step 702, the PTR 210 may detect a request for access to particular commercial-free content. For example, the PTR 210 may detect a "highlighting" of the movie Big Trouble In Little China within the EPG 402 (e.g., not a selection for immediate viewing but rather an identification of that movie such as shown by stipple shading in FIG. 4), and then upon detection of "selection" of the third selection 412, a search may be implemented directly against the terms "Big and Trouble and In and Little and China."

Next, at step 704, and continuing with the example throughout, the PTR 210 may make an initial determination as to whether or not a particular recorded commercial-free instance of the movie Big Trouble In Little China is accessible to the PTR 210. In some embodiments, a user may pre-configure the CPS module 220 to first search for recorded instances of commercial-free content, as this may be the most preferred source of media content, and possibly may be the most resource-friendly or efficient, for example, in terms of bandwidth, speed in sourcing, etc.

When the PTR 210 determines at step 704 that a particular recorded commercial-free instance of the movie Big Trouble In Little China is accessible to the PTR 210, process flow with the example method 700 may branch to step 706. At step 706, the PTR 210 may output the particular recorded commercial-free instance of the movie Big Trouble In Little China for display by, for example, the television 214c or the mobile device 216b of FIG. 2. However, when the PTR 210 determines at step 704 that a particular recorded commercial-free instance of the movie Big Trouble hi Little China is not accessible to the PTR 210, process flow with the example method 700 may branch to step 708.

At step 708, the PTR 210 may make a determination as to whether or not a particular commercial-free instance of the movie Big Trouble In Little China is authorized as accessible to the PTR 210. For example, the CPS module 220 may determine whether or not an account associated with a particular user of the PTR 210 is authorized to access content made available by HBO® (e.g., a corresponding subscription exists). In this example, when the PTR 210 determines that an account associated with a particular user of the PTR 210 is authorized to access content made available by HBO®, process flow with the example method 700 may branch to step 710. Otherwise, process flow with the example method 700 may branch to step 712, discussed in further detail below.

At step 710 the PTR 210 may make a determination as to whether or not a particular commercial-free instance of the movie Big Trouble In Little China is intended to be recorded, as opposed to output for immediate display by the television 214c for example. For example, the CPS module 220 may generate and output for display an interactive interface that includes a "Yes" selection, or the like, and when the "Yes" selection is selected process flow within the example method 700 may branch to step 714. At step 714, the PTR 210 may activate a recording of the particular commercial-free instance of the movie Big Trouble In Little China. As another example, the CPS module 220 may generate and output for display an interactive interface that includes a "No" selection, or the like, and when the "No" selection is selected process flow within the example method 700 may branch to step 706.

As mentioned above, process flow with the example method 700 may branch to step 712 when the PTR 210 determines that an account associated with a particular user of the PTR 210 does not exist, that account of which may otherwise provide an indication for authorized access to commercial-free content made available by HBO®. At step 712, the CPS module 220 may generate and output for display an interactive interface that includes a "Yes" selection and/or a "No" selection, or the like, along with various terms and/or conditions that if agreed to may enable immediate (and/or future) access to a particular commercial-free instance of the movie Big Trouble In Little China. Process flow may then proceed to step 716.

At step 716, the CPS module 220 may make a determination as to whether or not the various terms and/or conditions as put forth at step 712 were or have been agreed to. When the PTR 210 determines that the various terms and/or conditions as put forth at step 712 were or have been agreed to, process flow within the example method 700 may branch to step 710 for further action(s) in a manner as discussed above. When the PTR 210 determines that the various terms and/or conditions as put forth at step 712 have not been agreed to, process flow within the example method 700 may branch to termination step 718.

Such an implementation as discussed in connection with FIG. 7 may be beneficial and/or advantageous in many respects. For example, oftentimes content that is commercial-free may require authorization to access mainly by paying for it to recuperate monies that may or potentially could be lost by going commercial-free for that content. Accordingly, it may potentially be a better revenue generator for a company that can offer the content commercial free and either get a subscription for a service to get access to it or just for individual events.

As discussed throughout, the present disclosure is directed to or towards systems, devices, computer-program products, and methods for provisioning commercial-free or break-free media content, where example types of media or media content may include advertising media, broadcast media, social media, news media, and etc. For example, a method may include or comprise receiving, by a television receiver, a search string or query of one or more keywords to identify instances of media content matched with the one or more keywords. The method may include or comprise querying by the television receiver one or both of a local and non-local electronic programming guide database and at least one recorded content database to identify instances of media content matched with the one or more keywords. The method may include or comprise outputting by the television receiver for display by a presentation device, such as a television or handheld device, a particular selectable identifier (e.g., a selectable button or control) associated with each instance of media content that is matched with the one or more keywords and that is identified as commercial-free. Other embodiments are possible.

Additionally, or alternatively, the method may include or comprise selecting commercial-free instances of media content matched with the one or more keywords based upon a particular flag or bit associated with each instance of commercial-free content. It is contemplated that a particular flag or bit may be linked with a particular instance of commercial-free content as metadata or the like, and thus may be embedded within data corresponding with or to the particular instance of commercial-free content. Other embodiments are possible.

Additionally, or alternatively, the method may include or comprise detecting an indication of selection of a selectable identifier. In this example, it is contemplated that at least one of the following actions may occur: outputting to the presentation device for display a particular instance of commercial-free media content that is associated with the selectable identifier; and outputting to the presentation device for display an option to set a timer to record a particular instance of commercial-free media content that is associated with the selectable identifier. In this manner, the particular instance of commercial-free media content may be immediately or subsequently viewed as desired. Other embodiments are possible.

Additionally, or alternatively, the method may include or comprise outputting to the presentation device for display an indicator that when selected provides an option to define a particular media content source as having priority greater than another media content source. Additionally, or alternatively, the method may include or comprise outputting to the presentation device for display an indicator that when selected provides an option to make available access to commercial-free media content from a particular media content source. Additionally, or alternatively, the method may include or comprise outputting to the presentation device for display an indicator that when selected provides an option to make available media content related to a particular instance of commercial-free media content.

Additionally, or alternatively, the method may include or comprise outputting to the presentation device for display an indicator that when selected provides access to a website associated with a particular instance of commercial-free media content. Additionally, or alternatively, the method may include or comprise outputting to the presentation device for display an indicator that when selected provides access to an online social network. Additionally, or alternatively, the method may include or comprise outputting to the presentation device for display a particular advertisement selected based upon a particular association with a particular instance of commercial-free media content. In this manner, a number of user-configurable options are possible, to further the beneficial and/or advantageous features or aspects of the present disclosure. Still many other embodiments are possible.

Figure 8:
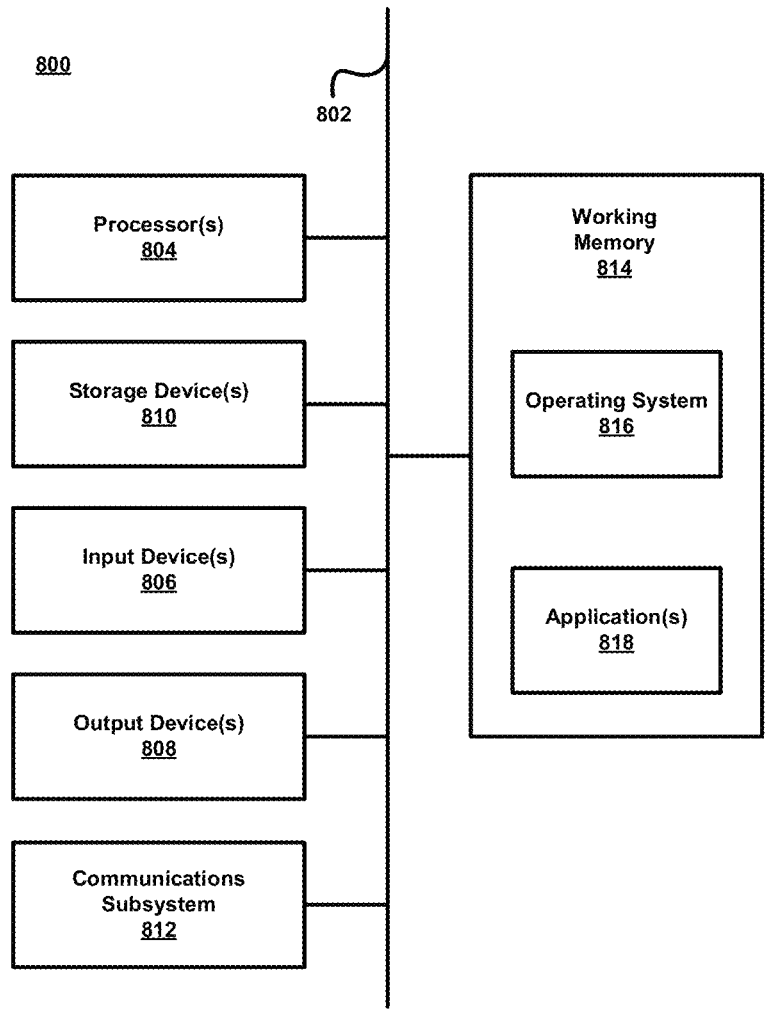
FIG. 8 shows an example computing system or device.

FIG. 8 shows an example computer system or device 800 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 800, such as any of the respective elements of at least FIG. 2. In this manner, any of one or more of the respective elements of at least FIG. 2 may be configured to perform and/or include instructions that, when executed, perform the method of FIG. 1 and/or the method of FIG. 7. Still further, any of one or more of the respective elements of at least FIG. 2 may be configured to perform and/or include instructions that, when executed, instantiate and implement functionality of the PTR 210 and/or the server(s) 218.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device comprising:
   one or more processing devices; and
   memory communicatively coupled with and readable by the one or more processing devices, the one or more processing devices configured to perform actions comprising:
   defining a priority with respect to a plurality of different data sources and performing a search for break-free media content in order to identify results in accordance with the defined priority, the performing the search comprising querying the plurality of different data sources;
   consequent to the search, causing output of options of media content to cause display of the options of media content with a display, the options including indicators as to which items of the media content correspond to break-free media content;
   processing a selection received via a user interface of one of the options that corresponds to an item of break-free media content;
   responsive to the selection received via the user interface of the one of the options, generating at least a portion of the item of break-free media content at least partially by stripping out one or more advertisements from corresponding media content, and causing output of at least the portion of the item of break-free media content to the display;
   processing a subsequent selection of an information button received while the item of break-free media content is being displayed; and
   responsive to the subsequent selection, causing output of an information interface to cause the information interface to be displayed with the display while at least part of the item of break-free media content is being displayed, the information interface to provide one or more items related to the item of break-free media content that is currently being displayed, the one or more items comprising:
   a first user-selectable option to request additional content associated with the item of break-free media content that is currently being displayed;
   a second user-selectable option that, when selected, initiates a posting to a user's associated social media account for an online social network, wherein the posting includes information identifying the item of break-free media content that is currently being displayed; and/or
   a presentation of targeted content related to the item of break-free media content that is currently being displayed.

2. The device of claim 1, where selection of the first user-selectable option causes opening of a window to display the additional content associated with the item of break-free media content that is currently being displayed and allow navigation with respect to the additional content.

3. The device of claim 2, wherein the first user-selectable option corresponds to a hyperlink to a website that includes the additional content.

4. The device of claim 1, wherein the targeted content related to the item of break-free media content that is currently being displayed comprises an option to access a different version of the item of break-free media content that is currently being displayed.

5. The device of claim 1, wherein selection of the first user-selectable option causes download for display of the additional content related to the item of break-free media content that is currently being displayed.

6. The device of claim 1, wherein the information comprises bibliographic information about the item of break-free media content that is currently being displayed.

7. The device of claim 1, wherein the posting identifies a source of the item of break-free media content.

8. A non-transitory, processor-readable medium having processor-readable instructions thereon which, when executed by one or more processing devices, cause the one or more processing devices to perform actions comprising:
   defining a priority with respect to a plurality of different data sources and performing a search for break-free media content in order to identify results in accordance with the defined priority, the performing the search comprising querying the plurality of different data sources;
   consequent to the search, causing output of options of media content to cause display of the options of media content with a display, the options including indicators as to which items of the media content correspond to break-free media content;
   processing a selection received via a user interface of one of the options that corresponds to an item of break-free media content;
   responsive to the selection received via the user interface of the one of the options, generating at least a portion of the item of break-free media content at least partially by stripping out one or more advertisements from corresponding media content, and causing output of at least the portion of the item of break-free media content to the display;

processing a subsequent selection of an information button received while the item of break-free media content is being displayed; and responsive to the subsequent selection, causing output of an information interface to cause the information interface to be displayed with the display while at least part of the item of break-free media content is being displayed, the information interface to provide one or more items related to the item of break-free media content that is currently being displayed, the one or more items comprising:
- a first user-selectable option to request additional content associated with the item of break-free media content that is currently being displayed;
- a second user-selectable option that, when selected, initiates a posting to a user's associated social media account for an online social network, wherein the posting includes information identifying the item of break-free media content that is currently being displayed; and/or
- a presentation of targeted content related to the item of break-free media content that is currently being displayed.

9. The non-transitory, processor-readable medium of claim 8, where selection of the first user-selectable option causes opening of a window to display the additional content associated with the item of break-free media content that is currently being displayed and allow navigation with respect to the additional content.

10. The non-transitory, processor-readable medium of claim 9, wherein the first user-selectable option corresponds to a hyperlink to a website that includes the additional content.

11. The non-transitory, processor-readable medium of claim 8, wherein the targeted content related to the item of break-free media content that is currently being displayed comprises an option to access a different version of the item of break-free media content that is currently being displayed.

12. The non-transitory, processor-readable medium of claim 8, wherein selection of the first user-selectable option causes download for display of the additional content related to the item of break-free media content that is currently being displayed.

13. The non-transitory, processor-readable medium of claim 8, wherein the information comprises bibliographic information about the item of break-free media content that is currently being displayed.

14. The non-transitory, processor-readable medium of claim 8, wherein the posting identifies a source of the item of break-free media content.

15. A method comprising:
- defining a priority with respect to a plurality of different data sources and performing a search for break-free media content in order to identify results in accordance with the defined priority, the performing the search comprising querying the plurality of different data sources;
- consequent to the search, causing output of options of media content to cause display of the options of media content with a display, the options including indicators as to which items of the media content correspond to break-free media content;
- processing a selection received via a user interface of one of the options that corresponds to an item of break-free media content;
- responsive to the selection received via the user interface of the one of the options, generating at least a portion of the item of break-free media content at least partially by stripping out one or more advertisements from corresponding media content, and causing output of at least the portion of the item of break-free media content to the display;
- processing a subsequent selection of an information button received while the item of break-free media content is being displayed; and
- responsive to the subsequent selection, causing output of an information interface to cause the information interface to be displayed with the display while at least part of the item of break-free media content is being displayed, the information interface to provide one or more items related to the item of break-free media content that is currently being displayed, the one or more items comprising:
  - a first user-selectable option to request additional content associated with the item of break-free media content that is currently being displayed;
  - a second user-selectable option that, when selected, initiates a posting to a user's associated social media account for an online social network, wherein the posting includes information identifying the item of break-free media content that is currently being displayed; and/or
  - a presentation of targeted content related to the item of break-free media content that is currently being displayed.

16. The method of claim 15, where selection of the first user-selectable option causes opening of a window to display the additional content associated with the item of break-free media content that is currently being displayed and allow navigation with respect to the additional content.

17. The method of claim 16, wherein the first user-selectable option corresponds to a hyperlink to a website that includes the additional content.

18. The method of claim 15, wherein the targeted content related to the item of break-free media content that is currently being displayed comprises an option to access a different version of the item of break-free media content that is currently being displayed.

19. The method of claim 15, wherein selection of the first user-selectable option causes download for display of the additional content related to the item of break-free media content that is currently being displayed.

20. The method of claim 15, wherein the information comprises bibliographic information about the item of break-free media content that is currently being displayed.

* * * * *